Aug. 12, 1969      L. W. SPIRO      3,461,265
ORBITAL WELD HEAD
Filed Jan. 17, 1967      3 Sheets-Sheet 1
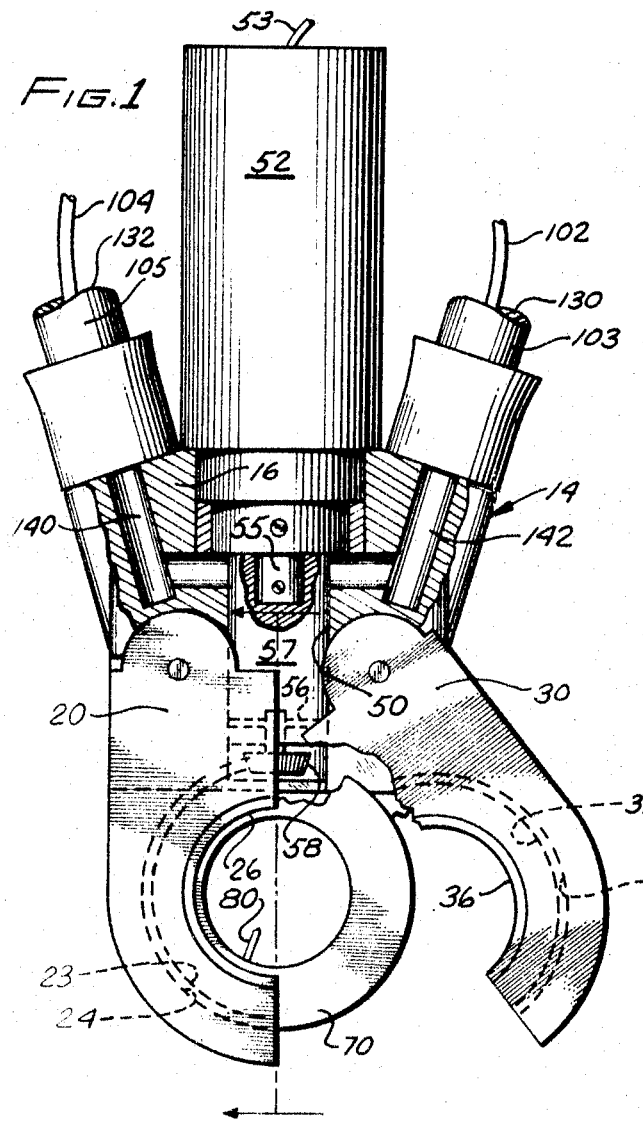
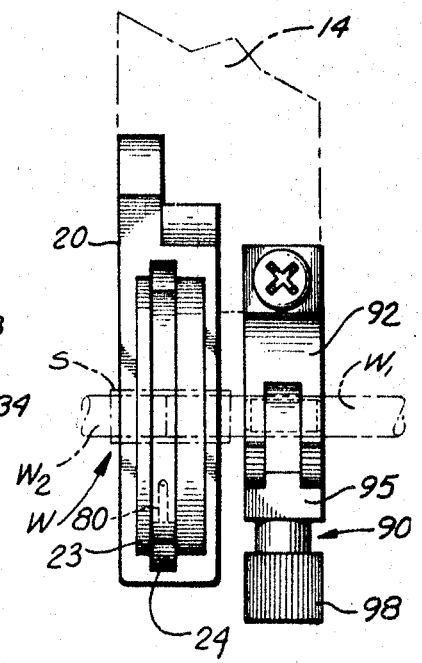
INVENTOR.
LLOYD W. SPIRO
BY Thomas S. MacDonald
ATTORNEY INVENTOR.
LLOYD W. SPIRO
BY Thomas S. MacDonald
ATTORNEY Aug. 12, 1969

L. W. SPIRO 3,461,265

ORBITAL WELD HEAD

Filed Jan. 17, 1967

INVENTOR.
LLOYD W. SPIRO

BY Thomas S. MacDonald

ATTORNEY

United States Patent Office 3,461,265
Patented Aug. 12, 1969

3,461,265
ORBITAL WELD HEAD
Lloyd W. Spiro, Canoga Park, Calif., assignor to North American Rockwell Corporation, a corporation of Delaware
Filed Jan. 17, 1967, Ser. No. 609,873
Int. Cl. B23k 9/02
U.S. Cl. 219—60  9 Claims

ABSTRACT OF THE DISCLOSURE

An orbital weld head having split clam shells which when closed together enclose a rotor ring gear in which an electrode is mounted. The ring gear and shells are kept in intimate electrical and mechanical engagement and are formed on their adjacent peripheries with grooves that define a circular plenum chamber for conducting purge gas. The gas is discharged through skew apertures in the ring to create a protective envelope around the weld area.

---

This invention relates to welding apparatus and more specifically to a compact, self-contained, orbital weld head having relatively few components.

Orbital TIG weld heads are known in the prior art as evidenced by U.S. Patents 3,194,936 and 3,238,347 both granted to R. G. Rohrberg et al. and which have been assigned to the same assignee as the instant invention. The term orbital TIG (tungsten inert gas) weld head refers generally to a welding device incorporating, as an essential component, a rotatable ring that carries a welding electrode that is moved circumferentially about the weld area of a tubular workpiece. It has become increasingly more important, such as in the aerospace industry for example, to design welding devices as miniature as possible because in-plate welding frequently must be performed in crowded and complex installations where access space is minimal. The resulting weldment, whether it is of the fusion, butt, or fillet type, must satisfy critical predetermined dimensions and be characterized by high integrity in order to satisfy exacting standards. A problem inherent in prior art welding devices concerns their multiple parts which unduly complicate the devices. As the number of components is increased, the possibility of inherent defects likewise increase, e.g., there is a concomitant increase in the risk that components will fail to mate and that satisfactory connections will become defective. Prolific amounts of purging gas often fail to effectively purge the air surrounding the weld area and hence the weld puddle entraps local impurities that weaken the integrity of the weldment. Previous attempts to concentrate purge gas in the vicinity of the weldment so as to form a continuous envelope for protecting it from atmospheric impurities have been ineffective. Problems have also been encountered in attempting to transmit electrical power from an external source to the electrode. Often interrupted or unpredictable current supply results and contributes to a weaker weldment.

In accordance with the instant invention, an orbital weld head is provided which eliminates many of the defects outlined above that confronted prior art devices.

Briefly described, the instant invention is a small, compact TIG weld head, having a minimum number of separable and movabel parts. The weld head in accordance with one embodiment of the invention, is characterized by a pair of of split clam shells pivotally mounted to a main body. When closed together the shells surround and position a rotor ring gear that carries a radially inwardly projecting welding electrode. The ring has a pair of mated arcuate segments which are swivelly connected at a pair of adjacent ends and are separably connected at their other adjacent ends. The separable ends can be easily swung away from one another to open the ring for placement around a tubular workpiece to be welded. Extending through the circumference of the ring is a series of skew apertures oriented tangentially to the ring axis. Adjacent peripheries of the clam shells and ring are grooved to constitute an annular plenum chamber for purging gas that is discharged through the skew apertures to form an envelope around the weldment. Electrical power is supplied to the electrode through the ring whose outer periphery is held in intimate electrical and mechanical engagement with the adjacent inner periphery of the clam shells. When the ring is positioned on the tubular workpiece and enclosed by the clam shells a clamping mechanism grips the workpiece and holds it in fixed relationship relative to the welding head. The weld head may use side plates that cover the majority of the openings between the clam shells and workpiece in order to minimize the escape of purging gas. In a second embodiment of the invention, rather than using two pivotally mounted clam shells only one clam shell is pivotally mounted to the main body.

The advantages of the instant invention will be best appreciated upon studying the following detailed description in conjunction with the drawings in which:

FIG. 1 is a front pictorial view of a welding head formed in accordance with this invention with portions removed and one clam shell pivoted to an open position, FIG. 2 is a side view of the welding device taken along line 2—2 of FIG. 1 showing a clamping mechanism attached to the weld head and a workpiece clamped in place prepared for welding.

Figure 5:
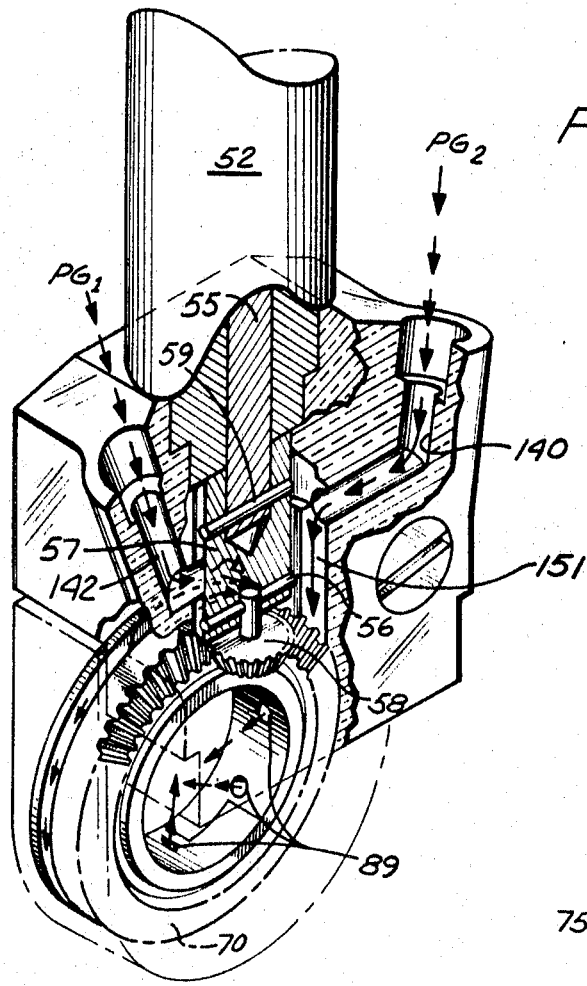
FIG. 5 is a perspective view similar to that of FIG. 4 showing passageways for purging gas that form a protective envelope around the weldment area.

Turning now to the drawings and especially to FIG. 1, a TIG weld head 10 is shown having a main body or mounting block 14. Near the distal end 15 of block 14 housing elements or split clam shells 20 and 30 are pivotally connected by pivot pins 22 and 32, respectively. Clam shells 20 and 30 are hollowed on their inner peripheries in the form of arcuate troughs 23 and 33, respectively. As will be explained, troughs 23 and 33 serve as bearing surfaces. Clamps 20 and 30 are shown in their closed and partially opened positions, respectively. Formed in the lower or bottom walls of troughs 23 and 33 are narrow channels 24 and 34 which in part constitute an annular plenum chamber for purging gas as will be more fully explained below. Inner rims 26 and 36 of clams 20 and 30 constitute approximately 180° arcs so that when the clams are closed against one another with their adjacent ends in mated relationship, a full circle is described.

Near the proximal end 16 of block 14, a socket 50 is formed to receive a small motor and reduction gear assembly 52. Electrical power supplied from a remote source (not shown) through electrical line 53 causes rotation of a drive-shaft 55. Referring to FIGS. 1 and 5, drive-shaft 55 imparts rotation through a coupling 57 to a pinion gear 58 suitably journalled in a bearing formed in block 14. Coupling 57 is connected to shaft 55 by a shear pin 59 and to pinion gear 58 by a dowell 56.

Figure 3:
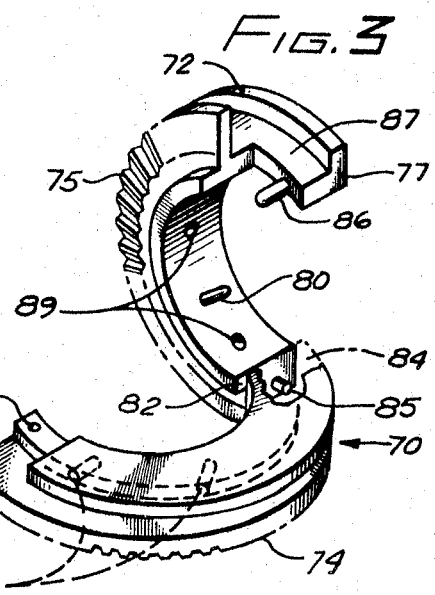
FIG. 3 is a perspective view of a segmented rotor ring gear that mounts a welding electrode.

Referring again to FIG. 1, when clam shells 20 and 30 are closed in mated relationship, they surround and constitute a housing for a rotor ring gear 70 dimensioned to intermesh with pinion gear 58. Rotation by pinion gear 58 causes rotation of ring gear 70 as arcuate troughs 23 and 33 provide a continuous guide-way and bearing surface for ring 70. As best shown in FIG. 3, ring gear 70, mounts an electrode 80 and has a pair of arcuate segments 72 and 74 describing arcs of approximately 180°. Segments 72 and 74 are shown with their planes rotated into approximately perpendicular relationship. A series of slightly bevelled teeth 75 designed to mesh with pinion gear 58 are formed over the entire surface of one face of ring 70. End 77 of segment 72 and end 79 of segment 74 are notched to complement one another and snugly interfit when ring 70 is closed. As opposed to ends 77 and 79 which are free and can be easily swung away from one another, ends 82 and 84 are swively connected together by a tangentially extending retaining pin 85. To further assure a tight fit between ends 77 and 79, a positioning pin 86 is mounted in end 77 to be inserted into a positioning aperture 88 formed in end 79. Extending through the circumference of ring 70 is a plurality of skew apertures 89 that are oriented so as to be tangential with the axis of ring 70. A continuous circular recess 87 is formed in the exterior periphery of ring 70. The function of the skew apertures 89 and recess 87 will be fully discussed below.

In the prior art orbital TIG weld heads, the rotor ring gear has a pair of arcuate sections which are easily separated at both their pairs of adjacent ends. For this reason, the segments of a previously matched set could become detached from one another with the result that a substituted segment might not be suitable, e.g., the teeth might not be uniformly spaced and large gaps might exist between adjacent ends causing significant electrical power losses. A misfit in general would make proper closure impossible. These problems are avoided in ring 70 because segments 72 and 74, rather than being detachable from one another, are swively connected. In addition, it is intended that segments 72 and 74 will be swively connected together before teeth 75 are cut to assure perfect mating and uniformity.

Figure 4:
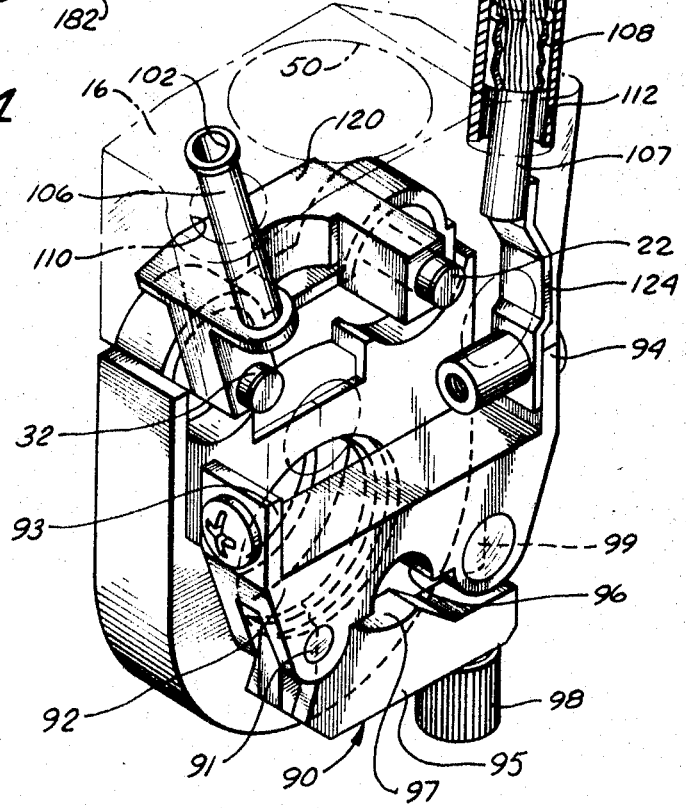
FIG. 4 is a perspective view with portions depicted in phantom lines showing electrical connections for the welding circuit as well as the clamp mechanism.

Mounted on block 14 is a clamp 90 shown in FIGS. 2 and 4 having a base portion 92 that is integrally formed with a pair of apertured arms 93 and 94 which are fixed to block 14 by a pair of anchoring screws or the like. Pivotally mounted to base 92 by way of a pin 91 is a cross-arm 95 that pivots in a plane perpendicular to the axis of ring 70 when in its operative position. The opposing surfaces of base 92 and cross-arm 95 are formed with arcuate gripping surfaces 96 and 97, respectively. An adjustment screw 98 with a knurled head extends through an opening in cross-arm 95 and is screwed into a barrel nut 99. Barrel nut 99 extends transversely to the axis of adjustment screw 98 and is disposed in an opening formed in base 92. By adjusting screw 98, a tubular workpiece W shown in FIG. 2 of a selected diameter within a predetermined range may be firmly held between gripping surfaces 96 and 97. When clamped in its welding position, a workpiece W will be aligned substantially concentrically relative to rotor ring 70. When the object is to weld two tubes together such as $W_1$ and $W_2$ their ends are aligned concentrically and are surrounded by a sleeve S.

For in-place welding tubes such as $W_1$ and $W_2$, ring 70 would be positioned onto and around the sleeve S and then enclosed by clam shells 20 and 30. When the overa'l weld head 10 is accurately oriented relative to the workpieces, then clamp 90 would be manipulated to fix the relationship between weld head 10 and the workpiece.

The welding circuit as shown in FIG. 1 for supplying electrical power to electrode 80 includes an electrical line 102 at a negative potential and an electrical line 104 at a positive potential. Electrical lines 102 and 104 are enclosed in insulating casing 103 and 105, respectively. Referring to FIG. 4, the manner in which electrical line 104 is connected to weld head 10 is depicted. The electrical connection between line 102 and weld head 10 is the same, so for the sake of clarity, it is not fully shown. The proximal end 16 of block 14 has a pair of slightly converging sockets 110 and 112. Projecting outwardly from sockets 110 and 112 are metal electrically conductive stub-outs 106 and 107. The tips of the individual electric wires constituting electrical line 104 are fanned out and wrapped around the outed periphery of the open end of stub-out 107. An inner ferrule 108 is swaged so as to hold the individual wires tightly against stub-out 107. Casing 105 is inserted into and retained by socket 112. If desired, a collar (not shown) may be swaged to an exposed area of the casing 105 to prevent it from retracting from socket 112. As shall be discussed more fully below, the annular space between electrical line 104 and casing 105 constitutes a passageway 132 for purging gas that passes through the openings between individual electrical wires and then into the center of hollow stub-out 107. Numerous other arrangements and techniques for connecting the electrical lines to the weld head would be quickly envisioned by those mechanics familiar with this field of technology.

Referring to FIG. 4 wherein block 14 is shown in phantom lines, electrical power for the welding circuit is supplied from a remote source (not shown). D.C. welding current in the range of 10 to 100 amps is transmitted from electrical line 102 and stub-out 106 to an electrically conductive bridge 120. Bridge 120 is integrally formed with a pair of pins 22 and 32 which as described in conjunction with FIG. 1 serve as pivot pins for clam shells 20 and 30, respectively. Therefore current is passed directly to clam shells 20 and 30, that in turn conduct current to ring 70. There are numerous points of physical engagement between the outer surface of ring 70 and the interior surfaces of the clams as defined by troughs 23 and 33. From ring 70, the current is transmitted to electrode 80 enabling a welding arc to be struck between it and workpiece W. The risk of generating an unpredictable or interrupted current in electrode 80 is significantly minimized because of the numerous electrical contact points between adjacent surfaces of the clam shells and ring 70. A serious defect encountered in related prior art weld heads arises because electrical contact with the rotor ring gear is made by spring biased copped pins or shoes. In either case, electricity is transmitted to the ring over a relatively narrow area. If the segments are not precisely matched or their coupling joints are characterized by gaps or are not adequately cleaned, then there is an electrical power loss when the current attempts to traverse the joints between the ring segments. This situation arises whenever the electrically conductive copper pin or shoe is making contact with the arcuate segment not carrying the electrode. These serious problems are avoided according to the instant invention because electricity is being transmitted to ring 70 from numerous contact points over the entire periphery of ring 70. In addition, metallic pins 85 and 86 promote a continuous smooth flow of current from one arcuate segment to the other.

The entire exterior of clams 20 and 30 are covered with a dielectric coating to prevent arcs from being struck between the clams and adjacent portions of the workpiece. Electrode 80 more particularly shown in FIG. 1 is accurately positioned in ring 70 to assure that arcs will not unexpectedly be struck between other portions of the ring and workpiece W. Workpiece W is at positive potential while the ring 70 is at negative potential, the difference in potential being in the order of 15 to 30 volts D.C. Power transmitted to workpiece W by way of the welding arc passes to clamp mechanism 90 and then the outward flow of current is transmitted through interconnecting conductive strip 124 and line 104.

High quality welds cannot be made unless the space surrounding the weldment is purged of atmospheric impurities and other contaminants. To avoid weldment failures due to their entrapping such contaminants, weld head 10 incorporates an inert gas purging system. Referring once more to FIG. 1, annular space 130 located between line 102 and casing 103 an annular space 132 located between line 104 and casing 105 constitute purging gas passageways. Although a single purge gas passageway for conveying gas from a single source would be adequate, it is desirable to have a backup or emergency passageway. The purge gas flowing through the passageways 130 and 132 will be referred to as $PG_1$ and $PG_2$, respectively.

Referring to FIGS. 4 and 5, purge gas $PG_1$ flows through stub-out 106 and into passageway 142 while purge gas $PG_2$ flows through stub-out 107 and into passageway 140. Purge gas $PG_1$ and $PG_2$ issuing from their respective passageways pass into a plurality of longitudinally extending grooves 151. Grooves 151 are cut in block 14 adjacent to coupling 57 and lead to plenum chamber 148. Those familiar with this field of technology would recognize numerous alternative ways for supplying purge gas to plenum chamber 148.

Plenum chamber 148 as best shown in FIG. 2 is defined by recesses or channels 24 and 34 of the clam shells and circular recess 87 of ring 70. A suitable plenum chamber could be provided by deepening the recesses in the clam shells while eliminating recess 87 on vice versa. Purge gas entering plenum chamber 148 through grooves 151 is driven through skew apertures 89. Jets of purging gas are ejected from those skew apertures 89 so as to impinge upon circumferentially spaced areas of the weldment. The apertures 89 are spaced so that the jets constitute a protective envelope around the weldment and prevent it from entrapping contaminants that would otherwise greatly weaken the weldment. Skew apertures 89 are oriented tangentially relative to the axis of ring 70 and the circular workpiece. This arrangement forces the jets to make a swirling or vortex flow around the weldment that causes partial vacuums that serve to draw or pull greater concentrations of purge gas around the weldment. If the apertures were oriented radially then the gas jets would be concentrated on localized areas only and the spaces between them would be more prone to entrapping contaminants. The purging gas is supplied in a continuous flow and the necessary flow rate depending upon the degree of weldment purity desired can be easily computed.

Another embodiment of this invention shown in FIG. 8 includes a main body 161, similar to mounting block 14 of the previous embodiment, that is integrally formed with a stationary clam shell 163. A straight edge 164 of stationary claim shell 163 intersects the axis of main body 161 at an angle $\theta$ of approximately 45°. Suitably connected to body 161 is a pivotable clam shell 165 having a straight edge 166, which, when a rotor ring gear 168 is positioned in place, meets and complements with edge 164. In this embodiment by making one of the clam shells stationary there is one less moving part and therefore the joints and potential leakage paths are further minimized. Also a greater portion of the overall welding head can be fabricated from a single piece.

Figure 6:
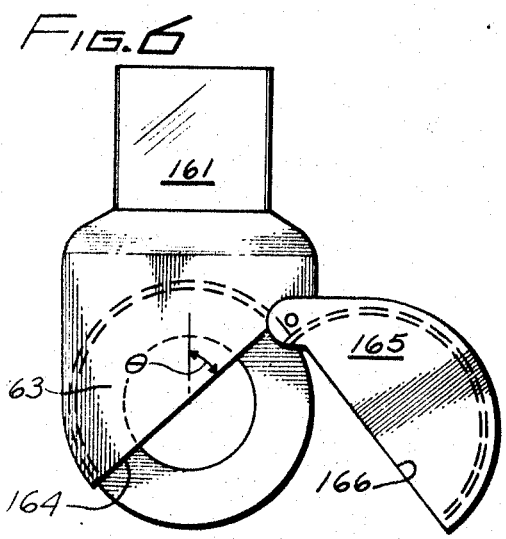
FIG. 6 is a planar partly schematic view of a second embodiment of a welding head having one stationary and one pivotable clam shell.
Figure 7:
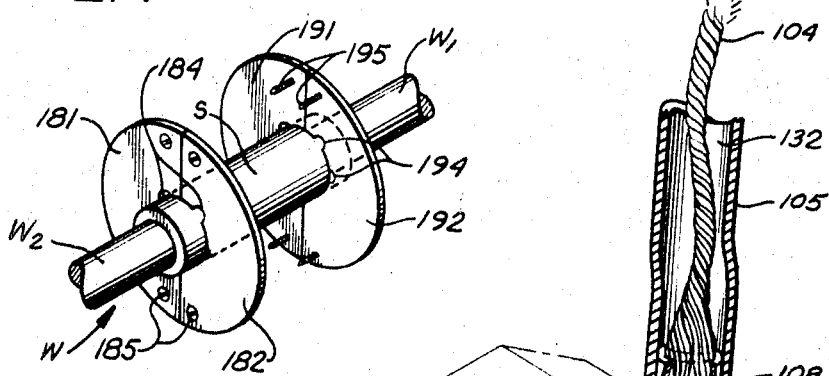
FIG. 7 is a perspective view showing a set of optional sideplates that can be connected to the opposite faces of the clam shells used in the first welding head embodiment.

Referring to FIG. 7, an optional accessory for increasing the residence time of the purge gas around the tube is shown that can be used in conjunction with the embodiment of this invention shown in FIGS. 1 through 5. Side plates 181 and 182 are provided that in use would be fixed by way of screw assemblies 185 to one face of clam shells 20 and 30. That is, side plate 181 would be secured to clam shell 20 and movable therewith and side plate 182 would be secured to clam shell 30. Side plates 191 and 192 would be fixed to the opposite faces of clam shells 20 and 30, respectively. As in the case of the clam shells, the inner edges of the side plates perfectly mate after the rotor ring gear is properly positioned. The inner diameters of the side plate assemblies are shown as sized to fit in approximately flush relationship with the outer periphery of sleeve S. Alternatively the side plates could be positioned on tubes $W_1$ and $W_2$. Use of the side plates permits the purge gas to be more restricted to the vicinity of the weldment. In addition, they shield the weldment area from external contaminants that might be carried to the weldment area by a slight breeze. A plurality of purge gas escape vents 184 and 194 are provided about the inner diameter of the plates adjacent the sleeve S. A similar set of side plates could be designed for use with the embodiment of this invention as shown in FIG. 6.

Although specific embodiments were chosen to best illustrate this invention, the scope and spirit of the invention are tended to be limited only by the following claims.

I claim:
1. An orbital welding device for welding annular workpieces comprising:
   a main body,
   a pair of adjacent complementary electrically conductive housing elements connected to the main body, at least one of which is pivotally connected thereto and being hollowed to form arcuate electrically conductive positioning around a workpiece, the housing elements being hollowed to form arcuate electrically conductive bearing surfaces,
   an electrically conductive detachable rotor ring on the bearing surfaces and adapted to surround the workpiece when the housing elements are in closed position, the bearing surfaces holding said ring in intimate mechanical and electrical engagement around its periphery,
   an inwardly projecting welding electrode mounted in the ring,
   means for supplying electrical power to the housing elements through which the power is transmitted to the ring and electrode, and,
   means connected to the main body for rotating the ring around the workpiece.
2. The structure according to claim 1 wherein an electrically conductive mechanism is connected to the main body for clamping in place the workpiece relative to the welding device and completing the electrical circuit to said electrode.
3. The structure according to claim 1 wherein one of the housing elements is fixed to the main body and the other is pivotally connected to the main body.
4. The structure according to claim 1 wherein the ring has a pair of arcuate segments swivelly connected together at a pair of adjacent ends.
5. The structure according to claim 4 wherein the ends opposite the swivelly connected ends of the segments are separable so that the ring can be placed on the workpiece.
6. The structure according to claim 5 wherein the separable ends are notched for making a complementary fit with one another.
7. The structure according to claim 5 wherein the separable ends include a retaining pin and aperture for detachably connecting the segments together, the pin being an electrical conductor for transmitting electricity between the segments.

8. The structure according to claim 1 comprising:
a passageway formed in the main body for conducting purging gas,
a plenum chamber comprising an annular recess formed by the inner and outer circumferential periphery of said housing elements and said ring, respectively, in communication with the passageway for receiving the purging gas, and
apertures formed in the ring extending into said recess through which the purging gas is passed to the weldment area of the workpiece.

9. The structure according to claim 8 wherein the apertures are skew so that gas jets passing therethrough will be oriented tangentially to the axis of the workpiece.

References Cited

UNITED STATES PATENTS

| | | | |
|---|---|---|---|
| 3,035,147 | 5/1962 | Latter | 219—60.1 |
| 3,194,937 | 7/1965 | Brons et al. | 219—60.1 |
| 3,395,262 | 7/1968 | Kazlauskas | 219—60.1 |

ANTHONY BARTIS, Primary Examiner

B. A. STEIN, Assistant Examiner

U.S. Cl. X.R.

219—125